United States Patent [19]

Cucchi

[11] Patent Number: 5,520,493
[45] Date of Patent: May 28, 1996

[54] DEVICE FOR LOADING BARS INTO AUTOMATIC LATHES

[75] Inventor: Pietro Cucchi, Bussero, Italy

[73] Assignee: Pietro Cucchi S.p.A., Italy

[21] Appl. No.: 194,610

[22] Filed: Feb. 10, 1994

[30] Foreign Application Priority Data

Feb. 19, 1993 [IT] Italy ................. MI93A0318

[51] Int. Cl.⁶ ................................. B23Q 5/22
[52] U.S. Cl. .................... 414/18; 82/127; 226/165
[58] Field of Search ................ 414/18, 14, 17, 414/751; 82/124, 126, 127; 198/748, 586; 226/102, 128, 129, 165

[56] References Cited

U.S. PATENT DOCUMENTS 4,953,429  9/1990  Arisaka et al. .................... 82/127
5,303,622  4/1994  Goda ................................ 82/127

FOREIGN PATENT DOCUMENTS 0570830  11/1993  European Pat. Off. .............. 82/127

*Primary Examiner*—Donald W. Underwood
*Attorney, Agent, or Firm*—Shlesinger, Fitzsimmons & Shlesinger

[57] ABSTRACT

A device (10) for loading bars in an automatic lathe comprises a pusher (13) with handling means (15,18) to push axially the leading end of a bar (12) into a lathe chuck (11) to be grasped by lathe means (21) moving parallel to the bar axis to feed the bar under machining tools (31). The pusher (13) with its own handling means (15,18) is supported on a truck (24) moving along guides parallel to the direction of movement of the bar (12). The truck (24) comprises connection means (30) to be constrained to the lathe bar-feed means for moving synchronously therewith.

10 Claims, 1 Drawing Sheet

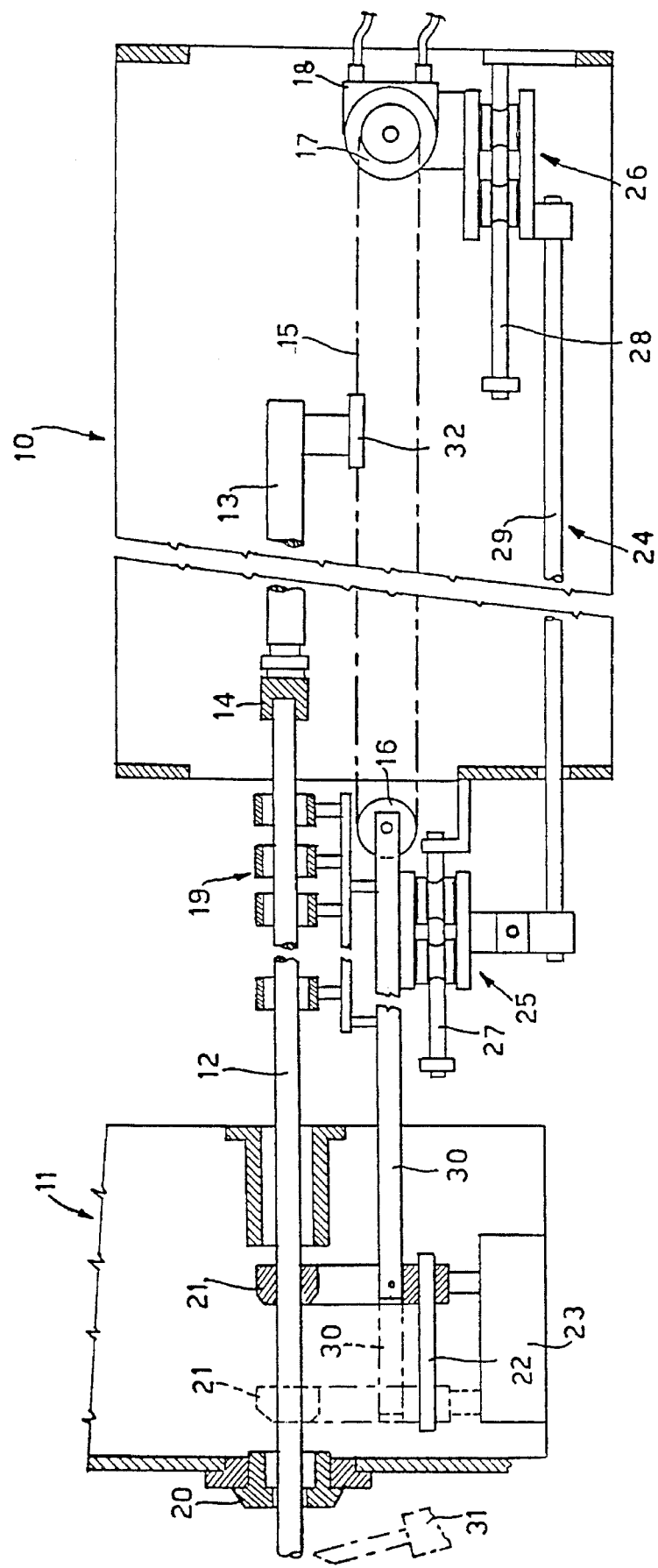

DEVICE FOR LOADING BARS INTO AUTOMATIC LATHES

BACKGROUND OF THE INVENTION

The present invention relates to a device for sequentially loading bars into an automatic lathe.

In the known art there are automatic lathes which receive sequentially by means of special loaders bars from which to make pieces or machined sections. The loader inserts axially the end of a bar behind the lathe chuck. The chuck comprises a clamp which grasps the bar and moves it axially beneath the machining tools for a length predetermined to be the actual length of the work to be machined. After completion of machining of the workpiece it is cut off and the clamp withdraws by running along the bar to return to the starting position, grasp the bar again and again advance to feed beneath the tools the section to be machined. The sequence of operations is repeated until the bar is exhausted. At this point the loader withdraws the remaining bar stub, discards it and inserts a new bar in the lathe so that the machining cycle can resume automatically.

There being inserted in the lathe only a short section of bar at a time, for the entire cycle of machining the bar is supported at the rear by the loader in such a manner that the bar can rotate in the chuck without bending or vibration. In addition, the rear end of the bar must remain constrained to the loader so that the final stub to be discarded can be withdrawn.

For the productivity of the machining station consisting of the combination of loader and lathe, it is essential that all the operations follow at high speed. In the embodiments of the known art a problem is synchronised operation of the loader and lathes especially during feeding of the sections to be machined and return of the clamp to the starting position.

Indeed, the bar must remain constrained at the rear to a loader clamp which is moved by a kinematic device, usually a chain, so as to push the bar into the lathe and subsequently withdraw the stub to be discarded. But during machining the bar must be moved with precision by the lathe clamp which thus moves not only the bar but must overcome the friction of the mechanism (in the meantime placed in idle) for movement of the loader clamp.

In addition to being difficult due to the effort required and for possible positioning errors it is also dangerous due to the possibility that the bar tail could slide out of the loader clamp, where it is usually held merely by elastic grip, during forward acceleration of the lathe clamp. Furthermore, during rearward travel of the lathe clamp the bar pushes the loader clamp handling mechanism. This could cause bending of the rotating bar with resulting strong vibrations.

SUMMARY OF THE INVENTION

The general purpose of the present invention is to overcome the above shortcomings by supplying a device for loading bars into automatic lathes which would permit the lathe chuck clamp a sure movement free of excessive stress without running the risk of bending or sliding out of the bar from the loader gripping members.

In view of said purpose it is sought in accordance with the present invention to provide a device for loading bars into an automatic lathe comprising a pusher with handling means to push axially the leading end of a bar into the lathe chuck to be grasped by lathe means moving parallel to the bar axis to feed the bar under machining tools and characterised in that the pusher with its own handling means is supported on a truck moving along guides parallel to the direction of movement of the bar and said truck comprises connection means to be constrained to the lathe bar feed means for moving synchronously therewith.

BRIEF DESCRIPTION OF THE DRAWING

To clarify the explanation of the innovative principles of the present invention and its advantages compared with the known art there is described below with the aid of the only annexed drawing a possible embodiment thereof by way of nonlimiting example applying said principles.

DETAILED DESCRIPTION OF THE INVENTION

The FIGURE shows a partial schematic cross section of a machining unit or station made up of a loader 10 and a lathe. Of the lathe is shown only the chuck assembly 11 the rest being easily imagined by those skilled in the art and not concerned by the present description.

The loader supplies sequentially a bar 12 by inserting it axially into the lathe chuck assembly. For this purpose the loader comprises a pusher 13 aligned with the loading opening of the chuck 11 and bearing at its head a clamp 14 for grasping the tail of the bar to be fed. The pusher 13 is constrained at the rear to a cursor 32 moved parallel to the extension of the bar pusher 13 by means of a transmission chain 15 wrapped around a pulley 16, 17. The chain is driven by a motor 18 (advantageously of the hydraulic type) to cause the bar pusher to complete the loading movements of the bar and withdraw the stub to be scrapped. Along the path of the bar and pusher is provided a guide 19, e.g. made up of a plurality of annular elements aligned and supported elastically for damping of the vibrations produced by high speed rotation of the bar. Suitable guides are shown for example in Italian patent application MI91U000074, which corresponds to U.S. Pat. No. 5,170,685, and patent IT 216 871.

The loader can also comprise automatic sequential insertion means for the bars in the clamp 14, taking them from a bar store, and automatic means for unloading from the clamp 14 the residual stub. For the sake of simplicity said automatic means are not shown. They are however commonly used and therefore easily imagined by those skilled in the art. For example, suitable means are shown in Italian patent application MI92A000978 and patent IT 216 871. As shown in the above patent rights, the guide 19 can open longitudinally to allow lateral insertion of the bar taken from the store.

The lathe chuck comprises bar feed means made up of a clamp or headstock 20 for grasping the bar and a bush 21 for reciprocating axial movement of the bar during machining. For its movement, the bush 21 runs by means of a known drive 23 along a guide 22 parallel to the bar feed direction. The clamp 20 and bush 21 are provided in such a manner as to permit the above described feed movement 'by sections'. In particular, after the bar has been inserted in the chuck by the loader, the gripping bush 21 begins to feed the bar under the lathe tools (shown schematically at 31). After completion of the machining of a section, the bush withdraws by running along the bar to return to the starting position (shown in solid lines in the FIGURE) and again grasps the bar to push it forward for machining of the following section.

The above description applies to a basically known technology readily imagined by those skilled in the art. For this reason, for example, there are not shown and described in detail the known elements which provide the movements, openings and closings of the various parts of the chuck designed to provide feed by sections.

In accordance with the innovative principles of the present invention the bar pusher assembly made up of the pusher 13 with the corresponding chain and drive motor is not, as in the known art, fixed to the loader frame but is instead supported by a truck 24 running in the bar feed direction. For example, the truck comprises a pair of carriages 25, 26 moving along respective guides 27, 28 each supporting one of the two chain pulleys and connected by a connection element or tierod 29. This embodiment of the truck has the advantage of supplying a convenient functionality of chain tightener and capability of regulation of the fixing position of a truck to the tierod 29 so as to be able to change at will the distance between the front carriage 25 and the rear carriage 26.

Advantageously the truck supports also the guide 19, e.g. fixed to the front carriage 25.

The truck 24 is connected to the handling bush 21 of the lathe by means of a tierod 30 so as to follow its movements.

In use, initially the pusher is completely retracted and the bush 21 is in the starting position shown in the FIGURE. The means of withdrawing the bar from the store position a bar in the guide 19 to be taken at the rear by the pusher clamp and inserted in the lathe chuck upon operation of the motor 18. When the bar has advanced into the chuck a pre-set amount the bush 21 is operated to grasp the bar and advance to feed the bar beneath the lathe tools. The forward movement of the bush is transmitted to the truck 24 through the bar 30 so that there is no danger that high accelerations might withdraw the bar from the rear clamp 14. After machining of the first bar section it is cut and the bush is commanded to run toward the starting position and again take the truck 24 away from the lathe. During this return operation the motor 18 has its supply circuit connected in discharge so that the friction produced on the bar by the chuck clamp 20 is sufficient to keep the bar steady while the truck 24 moves rearward. Advantageously, since the motor is hydraulic, it can be kept under a slight pressure to supply a 'sprung push' of the pusher against the rear end of the bar so as to provide forward movement of the chain which compensates the rearward movement of the truck while actually holding the bar and pusher steady and more securely in contact.

After execution of the backward movement the bush again grasps the bar and starts its fast forward travel while entraining the entire truck and feeding the chuck the second bar section. The cycle continues as just described until exhaustion of the useful bar. At this point the motor 18 is reversed so that the bar stub fastened to the clamp 14 is extracted from the lathe. Known unloading means extract the bar stub from the clamp 14 and replace it with a new bar to be machined.

At this point it is clear that the preassigned purposes have been met by supplying a loading device insensitive to brusque movements of the lathe loading bush which are produced during machining of the bar sections.

It should also be noted that the embodiment with the guide 19 moving with the truck permits having a length of bar which remains suspended between the end of the guide and the bush 21 and steady during the entire travel of the bush, differently from the known art, and thus producing better vibration damping.

Naturally the above description of an embodiment applying the innovative principles of the present invention is given merely by way of example and therefore is not to be taken as a limitation of the patent right claimed here. For example, the loader and lathe structures can vary from that shown schematically depending on practical necessities and actual dimensions of the bars machined. In addition, if it is not considered advantageous to fasten the guide to the truck 24 it can be fastened to the loader frame.

Finally, as will be clear to those skilled in the art., the truck handling means can be different from those shown just as the truck running guides can be provided differently. For example, gear and rack solutions can be conceived.

It is also noted that the form of the guides and carriages can be any known form capable of advantageously reducing running friction to a minimum. For example, the guides can be made up of shafts with round cross section on which run sheaves with convex impression.

What is claimed is:

1. In an automatic lathe of the type having thereon movable lathe bar feed means, a device for loading bars into the lathe, comprising a bar pusher and handling means therefor operable to push axially the leading end of a bar into said lathe to be grasped by said lathe bar feed means and to be moved thereby parallel to the axis of said bar to feed a portion of the bar into registry with the machining tools of the lathe, and characterized in that the pusher and said handling means therefor are supported on a truck mounted for movement along guides that extend parallel to the direction of movement of the bar, and means connecting said truck to the lathe bar feed means for movement synchronously therewith.

2. The invention in accordance with claim 1 characterised in that the handling means for the pusher comprises a powered chain to which is constrained one of the pusher.

3. The invention in accordance with claim 1 characterized in that the pusher has a leading end which has thereon a clamp that is operable for grasping the tail end of the bar for manipulation by said handling means.

4. The invention in accordance with claim 2 characterized in that said truck comprises two spaced carriages each supporting one of a pair of pulleys about which said chain travels in an endless path, and the carriages being interconnected together by a rigid connection element for regulation of the mutual spacing of the carriages and so as to permit regulation of the tension in the chain.

5. The invention in accordance with claim 1, characterized in that a guide is positioned between said pusher and said feed means for supporting the bar for axial movement.

6. The invention in accordance with claim 5 characterized in that the guide consists of a plurality of coaxially disposed annular elements aligned with said pusher and said feed means, and disposed to be traversed axially by the bar.

7. The invention in accordance with claim 5 characterised in said guide for the bar is supported on the truck.

8. The invention in accordance with claim 1, characterised in that the means connecting the truck to the lathe bar feed means comprises a tie rod.

9. The invention in accordance with claim 1 characterized in that the lathe bar feed means comprises a bush releasably attachable to said bar for effecting reciprocating movement of the bar.

10. The invention in accordance with claim 2 characterised in that the handling means comprises a hydraulic motor for driving said chain.

\* \* \* \* \*